(12) United States Patent
Smith et al.

(10) Patent No.: US 7,116,760 B2
(45) Date of Patent: Oct. 3, 2006

(54) SYSTEM AND METHOD FOR SINGLE-ENDED LINE ANALYSIS FOR QUALIFICATION AND MAPPING

(75) Inventors: David R. Smith, Salem, VA (US); Richard Liberman, Columbia, MD (US); Duane Eareckson, Lynchburg, VA (US); David Johnson, Roanoke, VA (US); Paul Francis Wyar, Mt. Airy, MD (US)

(73) Assignee: Acterna, L.L.C., Germantown, MD (US)

( * ) Notice: Subject to any disclaimer, the term of this patent is extended or adjusted under 35 U.S.C. 154(b) by 0 days.

(21) Appl. No.: 09/729,562

(22) Filed: Dec. 4, 2000
(Under 37 CFR 1.47)

(65) Prior Publication Data

US 2002/0067802 A1 Jun. 6, 2002

(51) Int. Cl.
*H04M 1/24* (2006.01)
(52) U.S. Cl. .............................. 379/22.02; 379/22.03; 379/27.01
(58) Field of Classification Search ............... 379/1.01, 379/27.01, 30, 22, 22.02, 22.03, 29.01; 324/512, 324/527, 532, 533
See application file for complete search history.

(56) References Cited

U.S. PATENT DOCUMENTS

| | | | | |
|---|---|---|---|---|
| 5,881,130 A | * | 3/1999 | Zhang | ..................... 379/27.08 |
| 6,091,713 A | * | 7/2000 | Lechleider et al. | |
| 6,104,197 A | * | 8/2000 | Kochan | ....................... 324/533 |
| 6,263,047 B1 | * | 7/2001 | Randle et al. | ............... 324/533 |
| 6,266,395 B1 | * | 7/2001 | Liu et al. | .................. 379/27.01 |
| 6,445,773 B1 | | 9/2002 | Liang et al. | |
| 6,538,451 B1 | * | 3/2003 | Galli et al. | .................. 324/533 |
| 2001/0043675 A1 | * | 11/2001 | Starr | ........................ 379/27.01 |
| 2003/0095591 A1 | | 5/2003 | Rekai et al. | |

\* cited by examiner

*Primary Examiner*—Barry Taylor
(74) *Attorney, Agent, or Firm*—Allen, Dyer, Doppelt, Milbrath & Gilchrist, P.A.

(57) ABSTRACT

In a system and method for determining the suitability of a copper pair line for xDSL service use, characteristic parameters of a copper pair line to be tested are measured. These characteristics include a wire gauge, length, and temperature of the copper pair line. In addition, characteristics such as the presence of short circuits, longitudinal balance, the presence of load coils, wideband noise and loop attenuation are tested for the copper pair line. A plant map of the copper pair line is then determined based on the measured and tested characteristics. Using the above characteristics and the plant map of the copper pair line, a transfer function representative of the plant map is determined which is then used to analyze and thereby qualify the copper pair line.

16 Claims, 9 Drawing Sheets

FIG. 8

SYSTEM AND METHOD FOR SINGLE-ENDED LINE ANALYSIS FOR QUALIFICATION AND MAPPING

BACKGROUND OF THE INVENTION

A. Field of the Invention

The present invention related to a testing system and method for copper pair lines, and in particular to a testing system and method for qualifying copper pair lines for IDSL, ADSL, HDSL, SDSL, SHDSL, and VDSL communication usage, as well as all other DSL-type technologies (hereinafter, "xDSL" indicating all the various DSL technologies and line codings).

B. Background

With increasing use and popularity of having computers at home and using them to access the Internet for a wide variety of goods and services, the demand for a communications infrastructure to support the increasing use has risen dramatically. Customers demand both the capability to send and receive large amounts of data, and the speed in performing such data transfers.

Internet access providers, cable communication companies, etc. are constantly working to fill those demands through the installation of fiber-optic and other hi-speed communications lines. However, in many areas of the country, such equipment and the services to support that equipment are either impractical to implement, prohibitively costly, or simply not scheduled to occur in the foreseeable future.

Telephone companies have tried to fill part of the demand by offering Digital Subscriber Line (xDSL) services that use the current infrastructure of copper pair lines to deliver hi-speed access to the Internet. The definition of copper pair lines includes any communication line made of copper or other similar material or composition known in the art. Unfortunately, due to limitations in the structure of the copper pair lines and the specifics of the different DSL technologies, xDSL service is not available to all telephone customers. The proper conditions have to exist in order for a copper pair line to handle xDSL communications. The suitability of a copper pair line for xDSL service is dependent on factors such as the length of the telephone line, the number of bridge taps on the line, material defects or shorts in the line, the wire gauge of the line, damage to the lines, proximity of sources of electromagnetic energy, etc.

In order to determine whether copper pair lines are suitable for xDSL service, telephone companies literally have to test the individual copper pair lines. However, using conventional techniques, this process involves sending service technicians to access both ends of a physical line, having one technician transmit a signal at one end of the line, and having the other technician receive the signal at the other end, and then analyzing the received signal. In addition, if a physical line is found to be defective or unsuitable for xDSL service, technicians might have to locate, identify and repair such defects. As one can imagine, this entire process is time consuming, labor intensive and costly.

Therefore, there currently exists a need for a system and method to test copper pair lines that avoids the problems and limitations associated with the current techniques. There also exists a need for a system and method to test copper pair lines that can aid in predicting, analyzing and locating defects in the lines so as to make the repair and qualification of copper pair lines for xDSL service more efficient. Further, there exists a need for a system and method for estimating the structural layout or "plant map" of copper pair lines in order to illustratively determine whether certain copper pair lines are suitable for xDSL service.

SUMMARY OF THE INVENTION

The present invention involves a single-ended line qualification (SELQ) testing procedure and protocol. From a central telephone exchange or office (CO), or even from the Customer Premise Equipment (CPE) side, all copper pair lines that connect to that location are individually tested. First, parameters such as each copper pair line's length, wire gauge, impedance, etc. are measured using known measuring techniques. Next, using a time domain reflectometer (TDR), a known signal or pulse is transmitted through each line; the CO or CPE can be used as the origin or starting point of the pulse signal. The return voltage of the pulse signal is measured, wherein impedance mismatches are identified by the characteristics of that return voltage. For example, with a TDR device having a display, impedance mismatches can be identified visually by the presence of significant changes in the graphical representation of the return voltage. The TDR's graphical representation or trace, along with information from other measurements, is analyzed to identify and locate faults on the line. That analysis will then generate a plant map indicative of the characteristics of the individual copper pair line, wherein the plant map configuration of all the copper pair lines connected to a specific starting point may be graphically represented. That plant map may then be used to generate a transfer function of each copper pair line. That transfer function can then be used to determine or at least predict a maximum bit rate that the line can handle, in conjunction with a confidence factor based on the above parameters.

In accordance with one embodiment of the present invention, in a system and method for determining the suitability of a copper pair line for xDSL service use, characteristics of a copper pair line under test are measured. These physical characteristics include a wire gauge, length, and temperature of the copper pair line. In addition, characteristics such as the presence of short circuits, longitudinal balance, the presence of load coils, and wideband noise are tested for the copper pair line. A plant map of the copper pair line is then determined based on the measured and tested characteristics. Using the above characteristics and the determined plant map of the copper pair line, a transfer function representative of the plant map is determined which is then used to analyze and thereby qualify the copper pair line.

According to a further embodiment of the present invention, a system for conducting single-ended qualification of copper pair lines for xDSL use incorporates means for receiving characteristic data on at least one copper pair line to be tested, the receiving means being operatively connected to one of a CO end and a CPE end of the copper pair line; and a controller device for analyzing the received characteristic data, the receiving means being operatively connected to the controller device wherein the characteristic data is inputted into the controller device, wherein the controller device includes a means for indicating whether the copper pair line to be tested is qualified for xDSL use. The means for receiving characteristic data includes at least one characteristic measuring element for receiving at least one characteristic measurement, and the controller device including means for receiving and interpreting the at least one characteristic measurement. The controller device includes means for outputting at least one test signal via the at least one characteristic measuring element and into the copper pair line to be tested whereby the characteristic measuring element receives at least one return test signal derived from the outputted test signal to be inputted into the controller device for interpretation. The qualifying means includes means for generating a plant map representing electrical characteristics of the copper pair line to be tested based on measurements received by the characteristic measuring element, and means for determining a transfer function representing signal characteristics of the copper pair line to be tested based on the plant map. The qualifying means includes means for determining at least one of a signal-to-noise ratio characteristic and a bit rate per tone characteristic of the copper pair line to be tested based on the transfer function and the wideband noise measurement, and means for determining at least one of a maximum bit rate characteristic of the copper pair line to be tested based on the signal-to-noise ratio and bit rate per tone characteristics.

BRIEF DESCRIPTION OF THE DRAWINGS

The accompanying drawings are included to provide an understanding of the invention and constitute a part of the specification.

DESCRIPTION OF THE INVENTION

The present invention is based on the development of a system for analyzing the structural and functional characteristics of a copper pair line, wherein the measurement of certain parameters are used to determine a copper pair line's suitability for xDSL service. By implementing the apparatus, methodology and protocol of the present invention, one can in a step-by-step process progressively qualify which copper pair lines are best suited for xDSL service.

Figure 1:
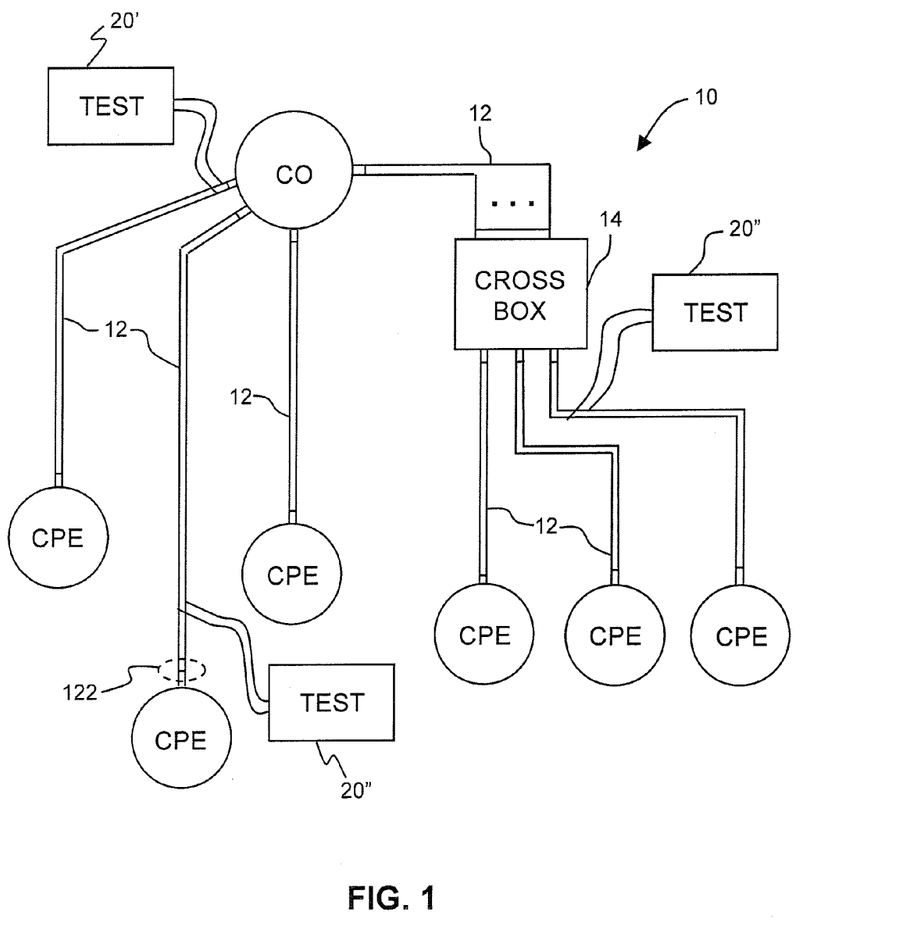
FIG. 1 is a system block diagram of a preferred implementation and application of the present invention.

FIG. 1 illustrates a system block diagram of the preferred implementation of the present invention. In particular, a conventional telephone system 10 that would be tested using the present invention would incorporate a central office or exchange CO through which a plurality of copper pair lines 12 are connected and processed. Each copper pair line would be composed of a cable loop pair 122 that has a CO end and a CPE end. Each cable loop pair terminates at a CPE end; a CPE is generally embodied in the copper pair lines that connect into individual homes or offices within proximity of the CO.

From either its CO end or the CPE end, a cable loop pair 122 is tested using test equipment 20' or 20"; test equipment 20' is the system implemented at the CO end; while equipment 20" is implemented at the CPE end. Applicants have found that the testing of the copper pair lines at the CPE end generates more accurate predictions of the suitability of the copper pair lines for xDSL service due to the difficulties relating to extended length attenuations, dispursions and interfering noise (i.e., disturbers). Alternatively, test equipment 20" can be implemented at a cross-box 14 of the copper pair lines. This would allow a user to test the lines so as to be able to qualify each of the copper pair lines for an entire neighborhood or for all the offices in a building. This alternative, like the testing at the CPE end, has been found to produce more accurate test results. However, testing of the lines at the CO is equally valid as that done at either the CPE end or at a cross-box of the copper pair lines, although more challenging.

Figure 2A:
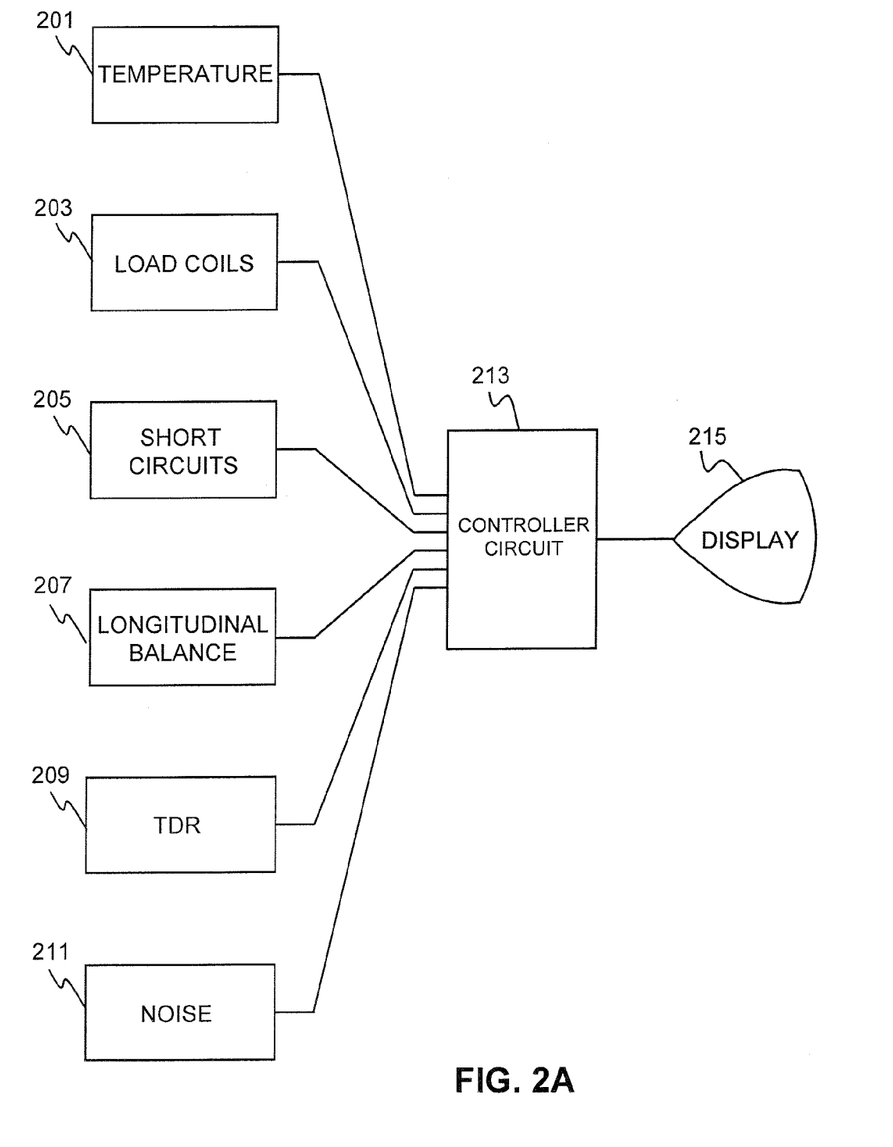
FIG. 2A is a system block diagram of the structural and operational components of the preferred embodiments of the present invention.

As shown in FIG. 2A, both test equipment 20' and 20" generally consist of components for, among others, (1) measuring the ambient temperature of the copper pair line 201; (2) detecting the presence of load coils 203; (3) detecting the presence of short circuits 205; (4) conducting a longitudinal balance test 207; (5) conducting time domain reflectometry 209 on the line; and (6) determining the presence of wideband noise on the copper pair line 211. In a preferred embodiment of the present invention, each of the above components are implemented into a single test instrument or system so as to make the conducting of the tests more efficient and portable. The structure and operation of those individual components would be consistent with similar devices known in the art. However, as one of skill in the art would understand, these components could also be implemented using a combination of known test devices or systems that are either interconnected or simply applied separately in sequence.

For example, component 201 for measuring the temperature of the copper pair line may consist of a conventional thermocouple device or other industrial temperature gauge. Applicants have found that, since the temperature of the copper pair line may vary along its length and as a result of environmental conditions at any point along the line, one way of including temperature as a factor in the analysis is by using the ambient temperature of the overall surrounding environment. For example, with copper pair lines that are suspended above the ground, the surrounding air temperature is used.

Component 203 for detecting the presence of load coils may consist of a conventional signal transceiver device capable of at least sweeping test signals through a plurality of frequency bands or "bins" by generating a signal at each of the frequency bins and detecting a test signal resulting from the generated signal. Short circuits in the copper pair line may be detected by component 205 using a conventional ohmeter, multimeter or other resistance measuring device designed for telecommunications applications.

Longitudinal balance testing by component 207 would be accomplished using any conventional voltage or current measuring device capable of measuring the common mode AC voltage or current, and the differential AC voltage or current in a copper pair line.

Time domain reflectometry would be implemented in component 209 using a time domain reflectometer, using either a time domain or a frequency domain algorithm. To save having a separate component in the system for determining the presence of short circuits in the copper pair lines, the function of component 205 may also be performed by component 209 since, as is known in the art, time domain reflectometry can be used to determine the presence of short circuits in metallic paired cables. Noise in the copper pair lines would be measured by component 211 using an analog receiver connected to an A/D converter so as to generate a digital representation of any noise signals it detects.

In one implementation of the invention as shown in FIG. 2A, components 201–211 are incorporated into a testing equipment 20',20" implemented as a single, dedicated testing device that includes a controller circuit 213 electrically connected to each of the components 201–211. The control circuit 213 includes a microprocessor, a digital signal processor (DSP) or other data processing device for receiving input data from each of the components 201–211, processing the input data so as to generate characteristic data on the copper pair line being tested, and outputting the characteristic data in a form that a user would understand. In particular, that testing device further includes a display device 215 or other know output mechanism through which the control circuit would display the characteristic data in a representative and user-understandable fashion.

Components 201–211 in this implementation embody either separate test circuit devices that generate data that is then inputted into the controller circuit 213, or simply the testing elements or probes for performing their respective functions. In that regard, controller circuit 213 is implemented with the conventional hardware/software to first generate/output test signals (where appropriate), and then receive/interpret input signals from the test elements or probes. Even more, with functions such as load coil testing, longitudinal balance testing and time domain reflectometry, as noted above, components 201–211 may be implemented as a single testing element or probe 219 (See FIG. 2C) that is designed to output as well as receive the appropriate signals for conducting the various tests, thereby minimizing the number of different components needed. In such an implementation, the individual components 201–211 would be furthered embodied in software programmed into the controller circuit 213 so as to control the testing element or probe 219.

Figure 2B:
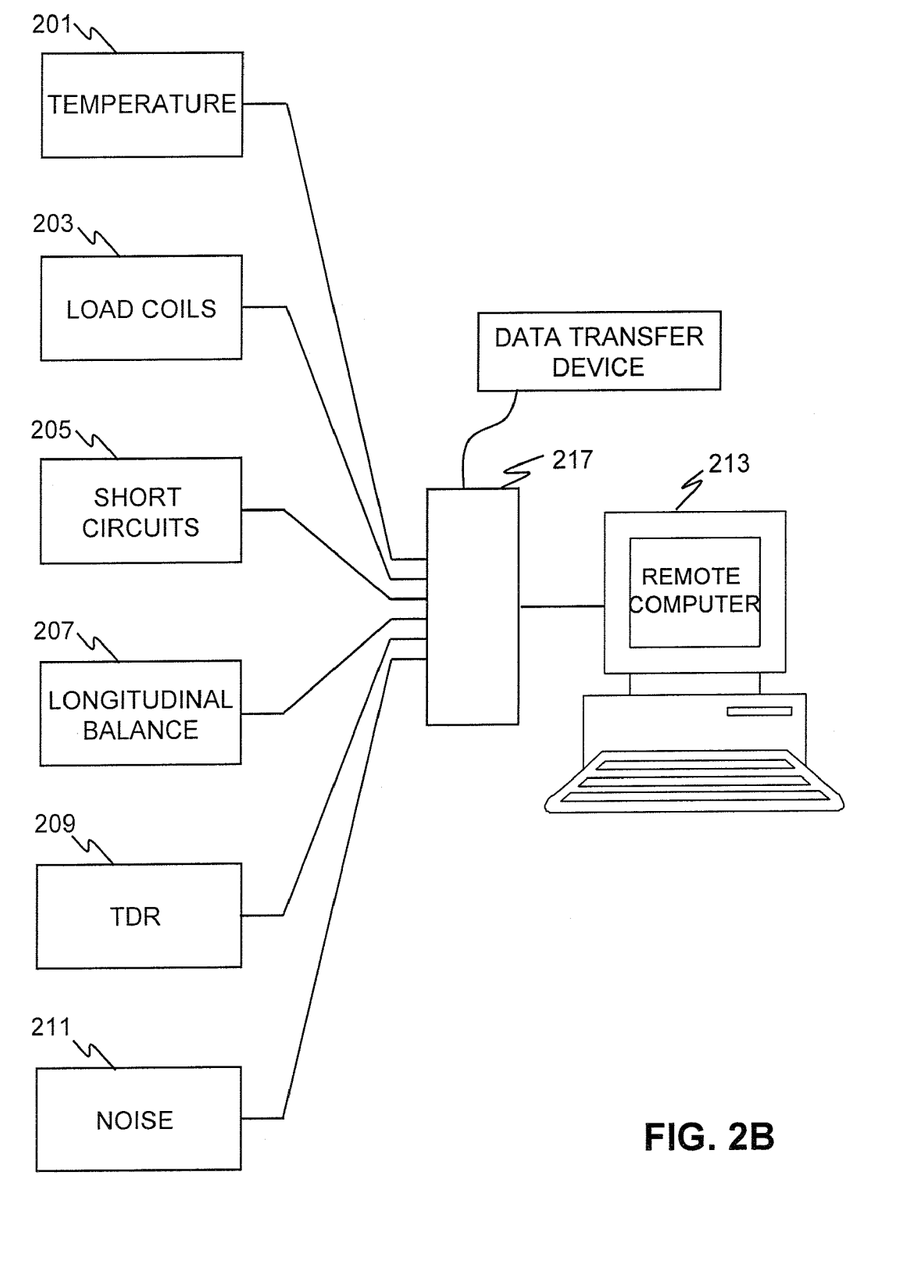
FIG. 2B is a system block diagram of an alternative implementation for the structural and operational components of the present invention.
Figure 2C:
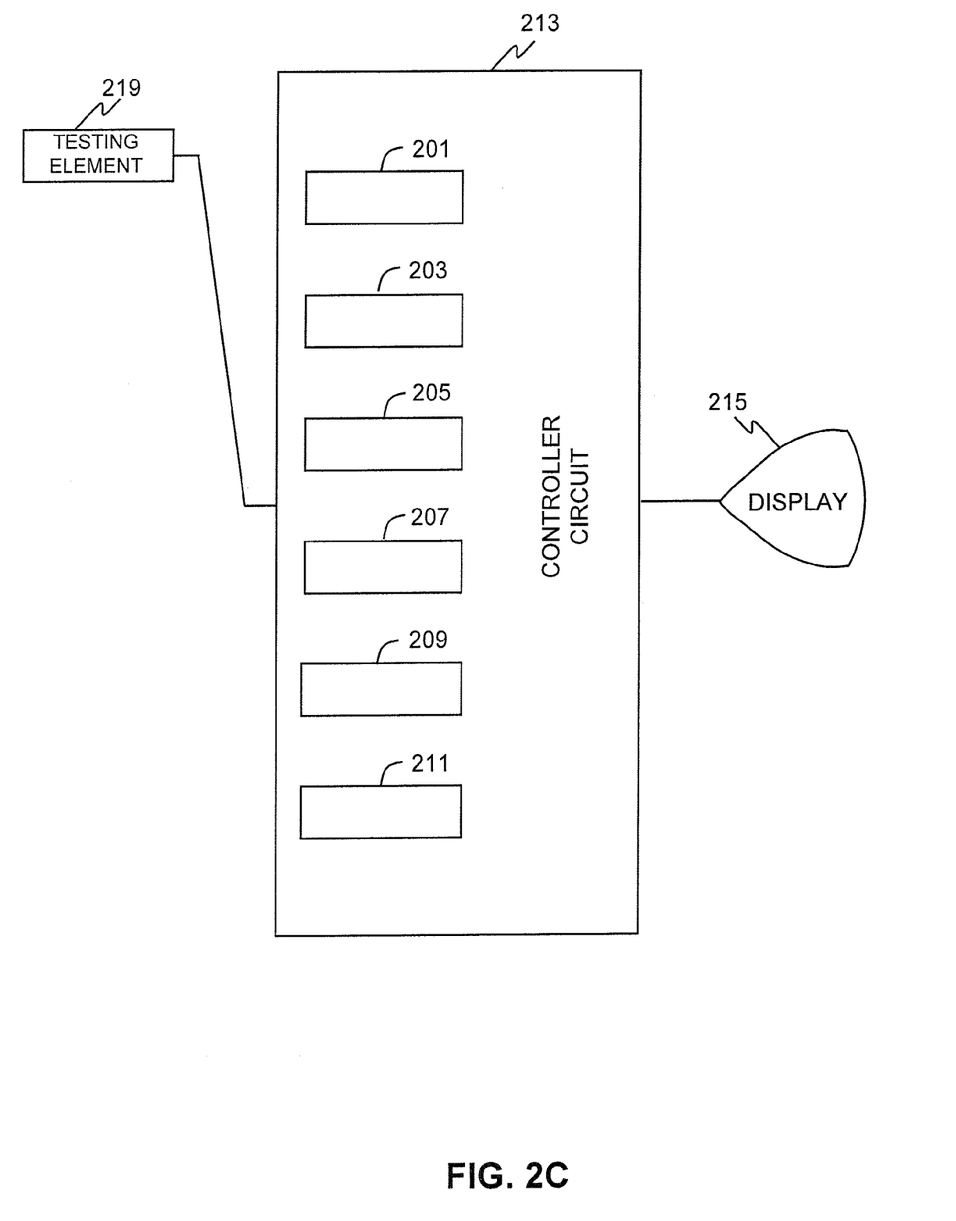
FIG. 2C is a system block diagram of a further alternative implementation for the structural and operational components of the present invention.

Alternatively, as illustrated in FIG. 2B, the controller circuit 213 can be implemented as a remotely-connected computer (e.g., desktop computer, laptop computer, mainframe, electronic controller) that communicates with the components 201–211 via hardwire cable, RF communication, infrared communication, laser communication or any other input/output data transfer device that one of skill in the art would deem appropriate under the circumstances. The components 201–211 are then each implemented as stand-alone instruments connected via a corresponding input/output data transfer device 217 so as to communicate data to/from the controller circuit 213. The components 201–211 may also be implemented as the testing elements or probes for performing their respective functions. Again, with functions such as load coil testing, longitudinal balance testing and time domain reflectometry, the same testing element or probe 219 may be used to perform a plurality of different tests. As with the prior implementation discussed above, the controller circuit 213 would then have to implement the necessary hardware and software to communicate and/or control this implementation of the components 201–211.

As one of skill in the art would understand, the data transfer device 217 may be (a) a plurality of communication devices each connected to one of the components 201–211, if separate components, and thus independently connected to the control circuit 213; (b) an integrated communication device connected to transfer data signals to and from the components 201–211 and to transfer data to and from the control circuit 213; (c) an integrated communication device connected to transfer data signals to and from the testing element or probe 219 and to transfer data to and from the control circuit 213; or (d) an input/output circuit device integral to the controller circuit 213 (i.e., a USB device) such that each of the components or a single testing element or probe are connected directly to or communicate directly with the controller circuit 213.

As an even further alternative, the invention may be implemented manually by the use of conventional implementations of each of the components 201–211 that are used in sequence in accordance with the testing protocol of the present invention, as will be explained further hereinbelow. A user would take the data outputted by each of the separate components, and input them into a data processing device (e.g., the implementation of the controller circuit 213) in order to generate the desired data.

Figure 3:
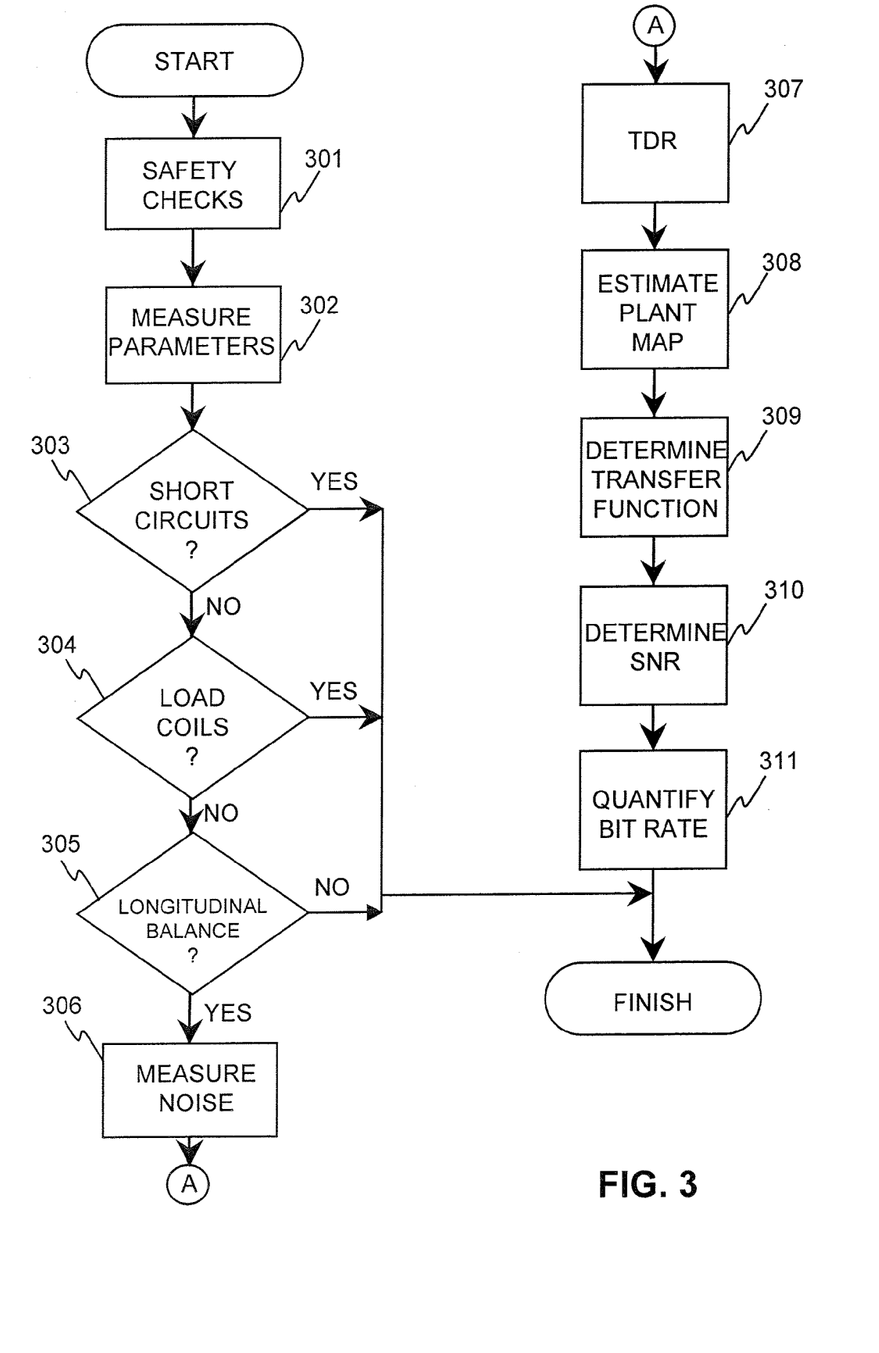
FIG. 3 is a flow diagram of the general steps that comprise the protocol for conducting the testing and qualification according to the present invention.

In the general operation of the invention, the protocol for conducting the SELQ test, as illustrated in FIG. 3, involves the following general steps:

Step 301: Performing preliminary safety checks on the line, such as testing for the presence of dangerously high voltages, in order to protect the person(s) conducting the test, innocent bystanders, as well as nearby property.

Step 302: Measuring parameters such as the wire gauge and length, and user inputting parameters of temperature of the line and cable construction type.

Step 303: Testing for the presence of short circuits on the line; if yes, the copper pair line cannot be used for xDSL service until repaired.

Step 304: Testing for the presence of load coils on the line; if yes, the copper pair line cannot be used for xDSL service.

Step 305: Measuring a longitudinal balance of the copper pair line to determine if the line is poorly shielded; if imbalanced, the copper pair line cannot be used for xDSL service.

Step 306: Measuring wideband noise in the line to determine both near-end and far-end noise levels in the line.

Step 307: Using time domain reflectometry to identify anomalies in the line.

Step 308: Using all the above-collected information; (a) estimate the plant map of the copper pair line;

Step 309: (b) Calculate the characteristic transfer function of the line being tested;

Step 310: (c) Determine the signal-to-noise (SNR) in the line; and

Step 311: (d) Quantify the bit rate of the copper pair line.

As noted above, the wire gauge, temperature and cable construction type are parameters that are considered in the qualification of the copper pair lines, as the inclusion of these parameters in the calculations will improve the accuracy of the analysis. However, Applicants have found that the lack of actual values for these parameters does not prevent the analysis from being conducted nor from generating valid data, as estimates of these parameters can be used in the analysis.

In determining whether load coils are present on the copper pair line, one implementation of this component 203 would be to generate an AC voltage into the copper pair line at various frequencies (i.e., a frequency sweep from 200 to 4000 Hz at increments of 100 Hz), measuring the return current, and then plotting the resulting data on an amplitude vs. frequency graph. The presence of a load coil is generally represented by the occurrence of half-sinewave-like "dips" in the graphical plot; each dip on the plot indicates one load coil. The response to the frequency sweep may even be used to determine the number of load coils present on the line. The presence of even one load coil is sufficient to disqualify a line from xDSL use.

Longitudinal balance testing by component 207 is accomplished, in one embodiment, by first measuring the power influence or common mode AC of the copper pair line. Then, the noise or differential AC in the line is measured. Longitudinal balance is calculated as the difference (in dB) between the power influence and the noise, which is indicative of an imbalance in resistance between the two cables in the cable loop pair of the line. If an imbalance exists or of the imbalance exceeds a predetermined threshold, the line is disqualified from xDSL use.

To measure noise in the line, component 211 implements noise measurements in each of the 256 discrete multi-tone (DMT) bands/bins used on a copper pair line, wherein each band/bin has a bandwidth of 4.3125 kHz. The noise levels for all the DMT bands/bins are then translated into a mathematical model that represents the noise characteristics of the copper pair line. To generate the mathematical model of the noise characteristics, one of skill in the art would understand that one method for doing so would be to manipulate the measured noise levels via Fast-Fourier Transform (FFT), or other equivalent signal analysis technique. In addition, if the measured noise is excessive, this may be used as a parameter to immediately disqualify a copper pair line from further consideration in the process.

In testing for loop attenuation on the line, component 209 implemented as a TDR device is used to transmit a known pulse waveform along the copper pair line. Return reflections of that known pulse waveform which show the resulting attenuation of the known pulse waveform through a copper pair line are indicative of various conditions, including the presence or absence of short circuits, the presence or absence of open circuits, the presence or absence of bridge taps, changes in the wire gauge of the line, the presence of water, and the length of the copper pair line. The existence and/or degree of existence of these conditions are in turn indicative of the line's capacity to handle xDSL service.

Figure 4:
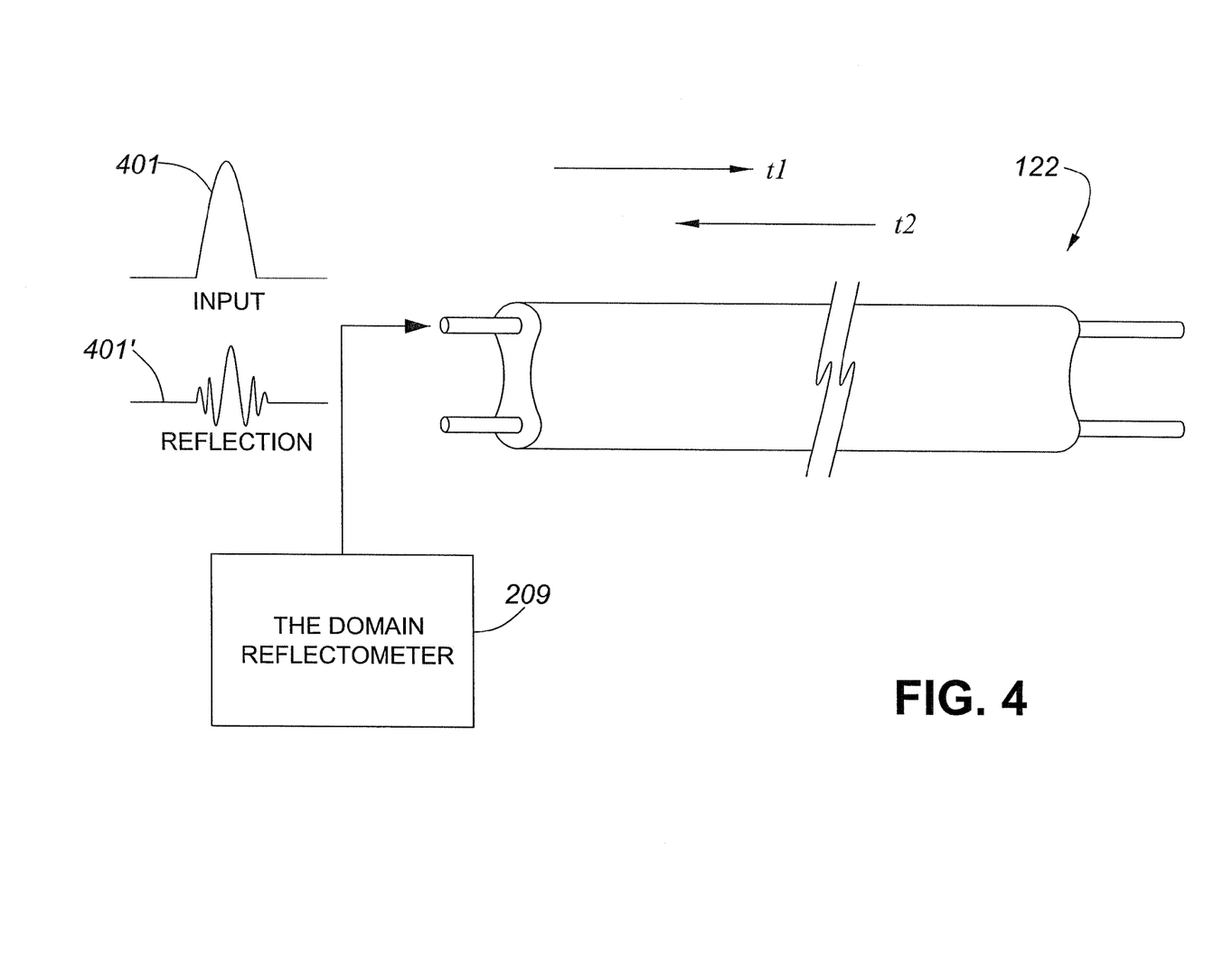
FIG. 4 illustrates one example for the time domain reflectometry implementation for determining the plant map of a copper pair line in accordance with the present invention.

As a more detailed example, FIG. 4 illustrates the use of a pulse 401 transmitted by the TDR 209 through a copper pair line 122 being tested. By tracking the time t1 at which the pulse 401 is transmitted in comparison to the time t2 at which a return pulse waveform 401' is received by the TDR 209, the length l of the copper pair line may 122 be predicted based on the known velocity v of electromagnetic energy (i.e., the speed of light) and the known velocity of propagation (VOP) through a copper wire of a known gauge and having an ideal or known impedance.

If the return pulse 401' were to return with an amplitude near the same level of the original pulse 401 or a smooth graphical representation of the original pulse with a gradual drop in amplitude, this would indicate that little or no change in the impedance along the length of the line was encountered, thereby indicating no substantial faults or damage present. On the other hand, a return pulse 401' with a substantially reduced amplitude level would show a change in the impedance of the line that then indicates that a fault along the line, such as damage to the copper cables, is present resulting in a partial reflection of the original pulse 401. Prominent dips in the graphical representation would indicate the presence of short circuits (e.g., drop in impedance), while prominent rises in the graphical representation would indicate an open circuit condition (e.g., increase in impedance). Bridged taps, water, poor splices or gauge changes are all different forms of either "shorts" or "opens" in the line. The time difference between t1 and t2 related to the partial reflection would be indicative of the distance between the starting point and the location of the damage.

Other measurements and calculations as discussed above may be accomplished using known algorithms implemented in conventional TDR devices. In addition to the type of analysis discussed above, other characteristics of the return pulse (i.e., whether the return pulse is in phase or out of phase, whether the return pulse the same polarity or the inverse of the original) may be indicative of other conditions of the line. However, as one of skill in the art will understand, the information one may derive from these characteristics will vary depending on the construction of and algorithm used by the TDR 209 implemented in the system of the present invention.

As demonstrated above, detailed analyses of the return pulse waveforms will reveal many of the characteristics of the line being tested. With lines that have few or no unusual configurations (i.e., no bridge taps, no change in wire gauge, no physical damage), those characteristics can easily be measured and quantified since specific return pulse waveforms will be indicative of certain characteristics, as known in the art. However, with lines that do have complex configurations, complex waveform analyses would have to be conducted on their return pulse waveforms, using algorithms and mathematical processes to identify and/or model the individual components of the measured waveform.

Figure 5:
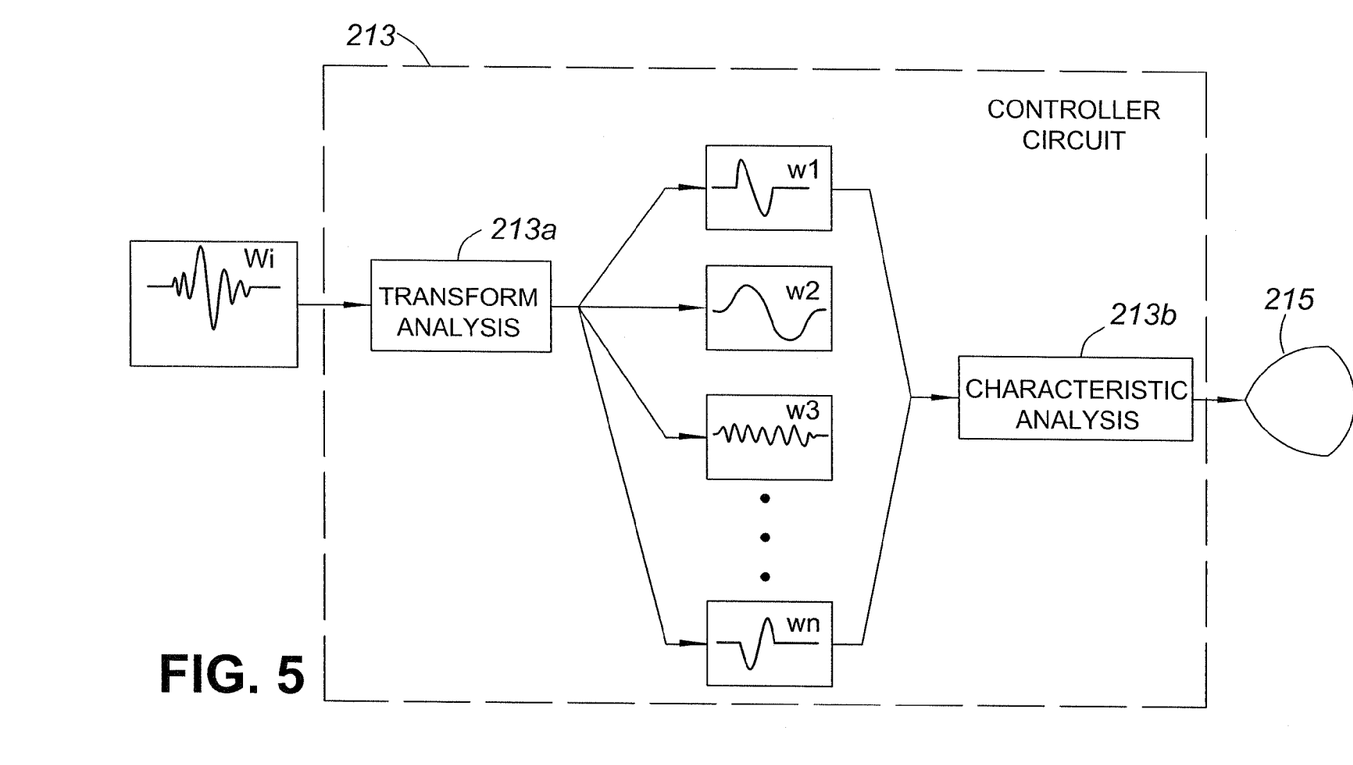
FIG. 5 illustrates one implementation for the controller circuit of the system using complex impedance analysis for determining the plant map of the copper pair line according to the present invention.

For such return pulse waveforms, as shown in FIG. 5, one implementation for determining the characteristics of the line, such as in the controller circuit 213, would include a data/mathematical processor device or programs 213a designed to separate a signal or mathematical representation of an inputted waveform Wi into its base component waveforms. The inputted waveform Wi originates from the testing conducted using the TDR component 209. Through processor 213a, the inputted waveform Wi is transformed such that its base components are identified and separated into component waveforms w1–wn. Those component waveforms can then each be analyzed by a further data processing device or program 213b to determine what characteristics of the copper pair line they represent.

As an output, the controller circuit 213 will convert the characteristic data results generated by the processor 213a and display them on the display 215. Depending on the requirements of the user, the data results are presented as either raw mathematical or formula data, graphically represented as equivalent circuit diagrams of the copper pair line's characteristics, and/or graphically represented as part of an overall diagram on the display 215 of the plant map of one or more copper pair lines connected to or originating from a specific CO or cross-box.

Circuit modeling software that simulates the equivalent circuit components of the plant map would then be used to generate the transfer function of each copper pair line.

Examples of circuit modeling systems known in the art include SPICE and MATLAB.

Figure 8:
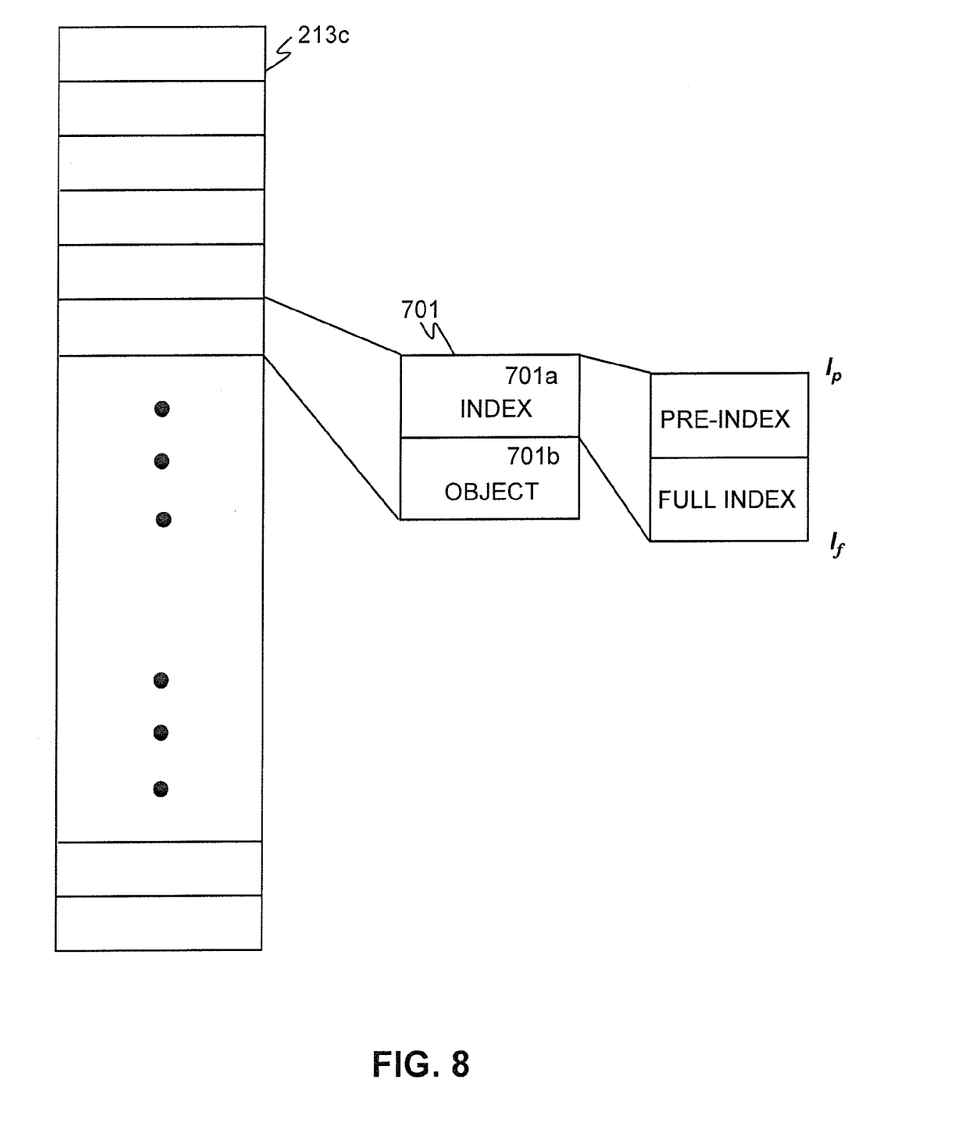
FIG. 8 illustrates one implementation for the data bank of known plant maps or wire plant prototypes according to the present invention.

Based on that determined transfer function and measured wideband noise as discussed above, data such as the signal-to-noise ratio and the maximum bit rate can be calculated or at least estimated. In particular, as shown in FIG. 8, the transfer function can be mathematically manipulated, either manually or within the controller circuit 213, to output a graphical representation of the signal characteristics S of the copper pair line. The wideband noise measurements are then similarly mathematically modeled so as to represent the noise characteristics N of the copper pair line. Graphically, the signal-to-noise ratio (SNR) of the copper pair line is the difference between the S function and the N function. The value of the SNR at any one frequency is then translated into the bit rate per tone that can be achieved on the copper pair line; the total area between the S and N functions represents at least an estimate of the maximum bit rate of the copper pair line.

Figure 6:
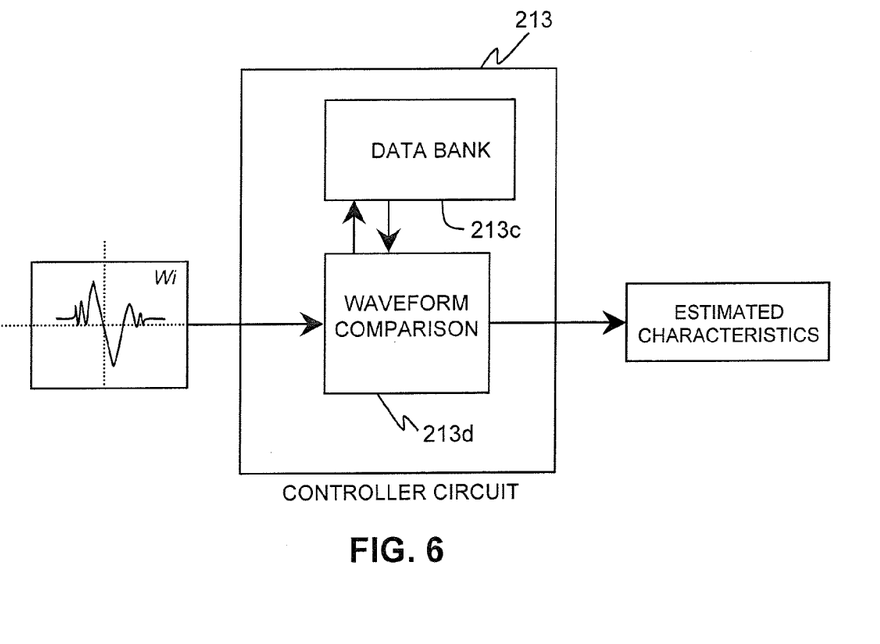
FIG. 6 shows a second implementation for the controller circuit of the system using a data bank of known plant maps to compared with the measured characteristics of the copper pair line according to the present invention.

In a second embodiment, the characteristics of the copper pair line being tested can be estimated indirectly by comparing the inputted waveform Wi with a library of specifically known transfer functions; in particular, the comparison is between the complex impedance represented by the return pulse signal and known transfer functions that represent known wire plant models. As illustrated in FIG. 6, this implementation involves the use of a memory or data bank 213*c* connected to or accessible by controller circuit 213. In using the data bank 213*b*, the controller circuit 213 uses a comparison device or algorithm 213*d* to compare the known in the data bank 213*b* with the inputted waveform Wi from the TDR device 209. In essence, the comparison device 213*d* would incorporate a system for searching the most relevant known transfer functions and comparing the characteristics of only those known transfer functions with the inputted waveform Wi.

One implementation for the bank of known transfer functions uses a plurality of known wire plant models or wire plant prototypes WPP representing standard loop models defined by CSA, ANSI and other standardization conventions. That bank of known wire plant prototypes can be supplemented with custom-designed models or prototypes derived from research, experimentation, simulation and/or field data.

Figure 7:
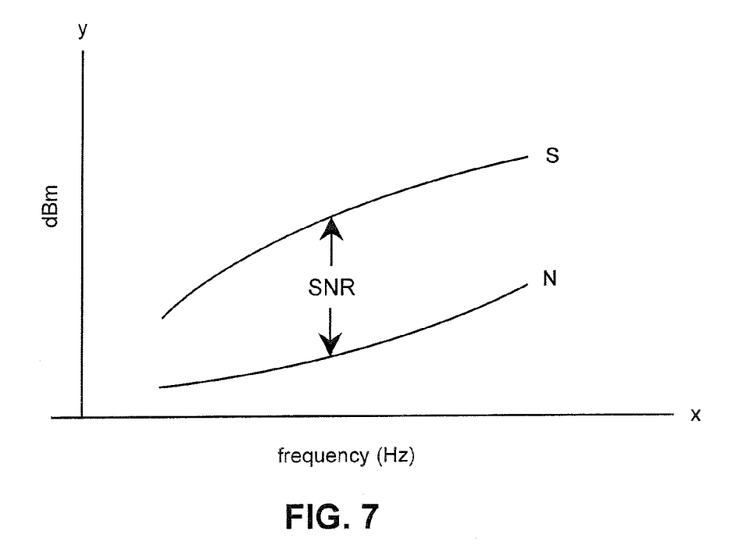
FIG. 7 shows a graphical representation of the signal-to-noise ratio characteristics of a copper pair line.

One implementation, as shown in FIG. 7, for how the bank of known transfer functions are stored in the data bank 213*c* involves the representation of each known transfer function data entry 701 in two major components: an index 701*a* and an object 701*b*. The index is composed of two parts as well: a pre-index Ip and the full index If. The pre-index Ip acts as a summary of the full index If consisting of every Nth data point from the full index where N≧2. The full index If consists of a table of values representing the complex impedance graph (real and imaginary single-ended line impedance v. frequency) of the known wire plant prototypes. The pre-index in an initial search through the library would be used to eliminate wire plant prototypes having characteristics very different from the inputted waveform Wi.

The object of each wire plant prototype data entry consists of a table of values representing the loop transfer function or insertion loss associated with each wire plant prototype. In general, that table data is determined experimentally from actual measured plant transfer functions.

In operation, a user would measure the complex impedance of the copper pair line using the TDR device 209; that complex impedance is then treated as the index of the wire plant to be determined. That complex impedance is used to first determine both pre-index and full index data relating to the wire plant to be determined. Within the controller circuit 213, the comparison device 213*d* compares first the pre-index and then the full index data of the unknown wire plant to the indexes of the library wire plant prototypes. After identifying the closest matches using, for example, the least squares method with interpolation and extrapolation algorithms/techniques, one or more candidate or bracketing candidates are selected as the best matches. Using the objects of the best matching candidates, the comparison device 213*d* assigns and/or interpolates an object for the wire plant to be determined. This object is then used as the transfer function for the line being tested.

In the actual implementation of forming the plant map based on the above-designed analysis methods, hereinbelow are two methods for using the TDR 209 in accordance with Steps 307 and 308 as described above. One method known to the applicants as the "109XC" SELQ approach uses the TDR 209 specifically to look for bridged taps and gauge changes in a loop. Since impairments in a cable loop pair cause either a "short" (a dip in a TDR graph) or an "open" (a rise in a TDR graph), this approach is used to search for the largest shorts and opens. The start and end of an impairment is found by searching for drastic changes in the slope of the TDR's graphical representation of the cable loop pair's characteristics. Specifically, this approach uses an algorithm to look for changes embodied in a graph that transitions from a flat slope to a steep slope and back to a flat slope. The algorithm will also detect the start of an impairment by detecting a slope change from "ascending" to "descending" or vice versa. The size/strength of the open/short is determined by the algorithm calculating the area under the curve between the start and end.

The algorithm's process is duplicated for various line lengths (and corresponding launch pulse widths) to produce a plurality of graphical curve traces that represent open/short impairment candidates. Each open/short candidate is saved in memory. All of the candidates are then analyzed to determine the most likely impairments. In particular, the candidates with the largest area and those that were found in the greatest number of traces. Those candidates not meeting that criteria are eliminated as being minor perturbations that should not be counted as true impairments.

In a second method known to the applicant's as the VT Mapping Single-Ended Line Qualification (VT MSELQ) approach, a loop simulator in conjunction with the TDR 209 is used to provides accurate TDR simulations based on candidate map input. The loop simulator may be implemented in any of the controller circuits or computers incorporated in the various embodiments described above. This approach determines the gauge, length, and termination ("open", "short", and "branch") of each cable segment starting with the first segment of cable (closest to the point of test) and progressing through each segment until the loop is completely reconstructed. As each segment is added to the candidate map, the loop simulator is used to verify that the simulated TDR graph is the same as the measured TDR graph to the point of reconstruction. Once the loop is completely reconstructed, the simulated TDR graph should be the same as the measured TDR graph over the entire length of the loop.

Using the TDR 209, cable "gauge" is determined by examining the "backscatter". Backscatter is the portion of a TDR trace that follows an impairment and has a unique shape for each gauge due to differences in cable parameters.

Comparing the actual TDR measurement to the known gauge traces will reveal the gauge of the cable.

Segment "length" is determined by adjusting the length of the cable candidate in the simulated TDR analysis, and calculating the error between the measured TDR and the simulated TDR for that candidate. The correct length will have the smallest error.

"Termination" is determined by comparing the actual TDR graph to stored graphs of the three possible terminations (open, short, and branch). The correct termination will have the smallest error when compared to the actual TDR trace.

As with the first method for generating a plant map, the transfer function and measured wideband noise as discussed above are used to determine the signal-to-noise ratio and the maximum bit rate. Again, as shown in FIG. 8, the transfer function can then be mathematically manipulated, either manually or within the controller circuit 213, to output a graphical representation of the signal characteristics S of the copper pair line. The wideband noise measurements are modeled and then graphed as the noise characteristic N of the copper pair line, wherein the signal-to-noise ratio (SNR) of the copper pair line is the difference between the S function and the N function. The value of the SNR at any one frequency translates into the bit rate that can be achieved on the copper pair line; the total area between the S and N functions represents at least an estimate of the maximum bit rate of the copper pair line.

In conjunction with the maximum bit rate of the copper pair line, one could also generate an empirical "confidence factor" to indicate the level of confidence one has in the accuracy of the estimated maximum bit rate. The value of the confidence factor in connection with any given copper pair line will depend on the accuracy of the measurements described above, the accuracy of the calculations derived from those measurements, the accuracy of the plant map generated from the measurements and calculations, and the calibration of the equipment used to generate the measurements.

In a preferred implementation of the present invention, the controller circuit 213 incorporates the hardware and software necessary for determining the transfer function of a line based on both calculating the transfer function from complex signal analysis and using a data bank of known transfer functions. Applicants have found that, under certain conditions, one method has distinct advantages over the other. Therefore, in order to maximize accuracy and efficiency, the present invention uses either method depending on the circumstances and on the desires/requirements of the user.

The present invention is not to be considered limited in scope by the preferred embodiments described in the specification. Additional advantages and modifications, which will readily occur to those skilled in the art from consideration of the specification and practice of the invention, are intended to be within the scope and sprit of the following claims.

We claim:

1. A method for determining the suitability of a wire communication line for xDSL service via single-ended analysis, comprising:
   a) obtaining a return waveform by using a TDR at a single end of the wire communication line;
   b) determining a transfer function based on the return waveform, the transfer function representing a signal strength or signal loss for each of the plurality of xDSL frequency bands;
   c) measuring wideband noise at a customer side of the wire communication line; and
   d) determining the signal to noise ratio based on the determined transfer function and the measured noise so as to quality the wire communication line for xDSL use;
   wherein step d) includes comparing the return waveform against a library of known transfer functions that represent known wire plant models to estimate the transfer function of the wire communication line.

2. The method according to claim 1, wherein step d) includes:
   deriving a plant map of the wire communication line from the return waveform, the plant map representing the structural layout of the wire communication line; and
   deriving the transfer function by performing circuit modeling analysis on the plant map.

3. The method according to claim 1, wherein step c) includes obtaining a noise signal over the plurality of xDSL frequency bands of the wire communication line.

4. A method for determining the suitability of a wire communication line for xDSL service use via single-ended analysis, comprising the steps of:
   a) receiving a return waveform by using a TDR at a single end of a wire communication line;
   b) determining a plant map of the wire communication line based on the received return waveform, the plant map representing a physical layout of the wire communication line;
   c) determining a transfer function representative of the determined plant map;
   d) measuring wideband noise at a customer side of the wire communication line; and
   e) determining the signal to noise ratio based on the determined transfer function and the measured noise so as to qualify the wire communication line for xDSL use;
   wherein steps b) and c) include comparing the return waveform against a library of known transfer functions that represent known wire plant models to estimate the transfer function of the wire communication line.

5. The method according to claim 4, wherein step b) includes determining a wire gauge and length of the wire communication line.

6. The method according to claim 4, wherein step c) includes determining the complex impedance of the wire communication line.

7. The method according to claim 6, wherein step c) includes performing circuit modeling analysis on the plant map.

8. The method according to claim 4, further comprising step f) determining a bit rate for the wire communication line based on the signal to noise ratio.

9. The method according to claim 8, wherein step f) further includes determining a maximum bit rate and confidence factor based on the determined bit rate and the signal-to-noise ratio for the wire communication line.

10. The method according to claim 4, wherein step c) includes deriving the transfer function by performing circuit modeling analysis on the plant map.

11. A system for conducting single-ended qualification of wire communication lines for xDSL use, comprising:
   a TDR that transmits a signal at a single end of a wire communication line and receives a return waveform; and
   a controller device connected to the TDR and operable to determine a transfer function based on the received return waveform, to measure wideband noise at a customer side of the wire communication line and to determine the signal to noise ratio based on the determined transfer function and the measured noise so as to qualify the wire communication line for xDSL use, the transfer function representing a signal strength or loss for each of the plurality of xDSL frequency bands of the wire communication line;

wherein the controller device determines the transfer function by comparing the return waveform against a library of known transfer functions that represent known wire plant models.

12. The system according to claim 11, wherein the controller device determines the transfer function by:

deriving a plant map of the wire communication line from the return waveform received by the TDR wherein the plant map represents the structural layout of the wire communication line; and p performing circuit modeling analysis on the derived plant map.

13. A method for determining the suitability of a wire communication line for xDSL service via single-ended analysis, comprising:

transmitting by a TDR a test signal at a single end of the wire communication line;

obtaining a return waveform of the transmitted test signal;

determining a signal strength or loss of the wire communication line for each of the plurality of xDSL frequency bands based on the obtained return waveform, wherein the step of determining the signal strength or loss includes comparing the obtained return waveform against a library of known signal strengths or losses that represent known wire plant models; and calculating a bit rate of the wire communication line for XDSL use based on the determined signal strength or loss.

14. The method according to claim 13, further comprising:

obtaining a noise signal over the plurality of xDSL frequency bands of the wire communication line;

wherein the step of calculating includes determining the S/N ratio based on the determined signal strength or loss and the obtained noise signal.

15. The method according to claim 14, wherein the, step of calculating further includes determining a confidence factor of the calculated bit rate.

16. The method according to claim 13, wherein the step of deriving a plant map includes determining a wire gauge and length of the wire communication line.

* * * * *

UNITED STATES PATENT AND TRADEMARK OFFICE
CERTIFICATE OF CORRECTION

PATENT NO.         : 7,116,760 B2
APPLICATION NO. : 09/729562
DATED                : October 3, 2006
INVENTOR(S)       : Smith et al.

It is certified that error appears in the above-identified patent and that said Letters Patent is hereby corrected as shown below:

Col. 12, line 5, "as to quality the wire" should read -- as to qualify the wire --

Col. 14, line 9, "XDSL use based on" should read -- xDSL use based on --

Signed and Sealed this

Fifteenth Day of May, 2007

JON W. DUDAS
*Director of the United States Patent and Trademark Office*